Jan. 19, 1965  F. G. GUNN  3,165,969
PHOTOGRAPHIC PRODUCTION OF ANAMORPHOUS RECORDS
Filed Oct. 24, 1955

Inventor
Frank George Gunn
by Roberts, Cushman & Grover
Attys

United States Patent Office 3,165,969
Patented Jan. 19, 1965

3,165,969
PHOTOGRAPHIC PRODUCTION OF ANAMORPHOUS RECORDS
Frank George Gunn, Pinner, England, assignor to Technicolor Corporation of America, Hollywood, Calif., a corporation of Maine
Filed Oct. 24, 1955, Ser. No. 542,426
Claims priority, application Great Britain Nov. 2, 1954
2 Claims. (Cl. 88—24)

This invention relates to the photographic production of anamorphous images of objects or scenes.

In order to produce by optical projection, of kinematograph films for example, images having an angular subtent parallel with one plane (generally a horizontal plane) that is considerably wider than the angular subtent parallel with a plane perpendicular to that first mentioned (generally a vertical plane) it is not unusual to produce by optical means upon a record, such as a kinematograph positive film, an anamorphous image of an object or scene, and to introduce complementary anamorphism by optical means in displaying an image derived from this anamorphous image, for example in projecting it upon a kinematograph viewing screen. Thus the anamorphosis effected in making the record may be such that vertical dimensions and horizontal dimensions that are equal in the original object or scene have a ratio of about 2:1. In the display of the image on the record the complementary anamorphosis is effected, so that vertical and horizontal dimensions, that are equal in the record have a ratio of 1:2 in the display image.

The present invention is concerned with the production of the anamorphous image upon the record. According to prior proposals this has been effected by a single step of optical anamorphosis, for example by photographing the original object or scene by means of an optical system comprising effectively one or more cylindrical refracting or reflecting surfaces, whereby a negative record having the ultimately required degree of anamorphism was produced. This negative record was printed without further anamorphosis as a positive record for display by complementary anamorphotic projection. Also the original scene has been photographed without anamorphosis, and anamorphosis introduced during subsequent printing of positive film.

Whereas various degrees of anamorphosis are theoretically useful, as a practical matter it has been found preferable to photograph an original scene and project an image which is approximately two times as wide as high, and consequently most theatres are equipped with an anamorphotic lens for theatre projection which expands the horizontal dimension of a cinematographic record or film frame twice as much as the vertical dimension is expanded. This custom requires anamorphosis between original scene and display print to be such that horizontal and vertical dimensions that are equal in the original object or scene have in the print a ratio of 1:2 that is, the anamorphotic factor is ½.

According to the present invention, the required degree of anamorphism in the record for display is produced in two stages: first photographing the object or scene so as to produce an image on a primary record having a degree of anamorphism and second printing the primary record, directly or indirectly, with an additional degree of anamorphism, upon another record for display whereby the total degree of anamorphism introduced into the image on the record for display is the product of the factors of anamorphism separately introduced in the two stages.

The invention is described with reference to the accompanying drawing in which.

In carrying out the invention the object or scene may be photographed upon a primary record, such as a negative photographic film, by means of an optical system comprising one or more effectively cylindrical refracting or reflecting surfaces so as to produce an image thereon having a degree of anamorphism, and an image of this primary record may be printed by means of an optical system comprising one or more effectively cylindrical refracting or reflecting surfaces onto a secondary record, such as a positive photographic film or a matrix from which display copies may be made by the well known imbibition process. In particular the degree of anamorphism introduced into the image on the primary record may be such that the vertical dimension and horizontal dimensions that are equal in the original object or scene have, in the image, a ratio of 1.5:1, the anamorphotic factor in this stage thus being 0.667 or ⅔: and the additional degree of anamorphism introduced in the second or printing stage may be such that vertical dimensions and horizontal dimensions that are equal in the image on the primary record have, in the image on the secondary record, a ratio of 1.33:1, the anamorphotic factor in this stage being 0.75 or ¾. Thus vertical and horizontal dimensions that are equal in the original object or scene have a ratio of 2:1 in the image on the secondary record, the overall anamorphotic factor being 0.5. Such a secondary record may be satisfactorily displayed by means of an optical projection system comprising effectively cylindrical refracting or reflecting surfaces and such as to produce anamorphosis whereby the ratio of vertical and horizontal dimensions that are equal in the image on the secondary record for display have a ratio of 1:2 in the displayed image, that is such as to produce an anamorphotic factor of 2.

Figure 1:
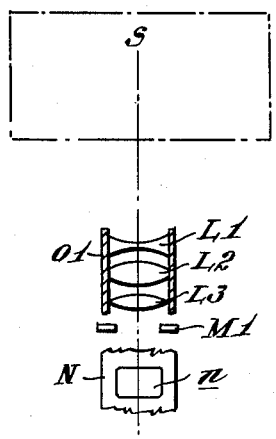
FIG. 1 is a schematic view illustrating the photographing of an anamorphous negative record.
Figure 4:
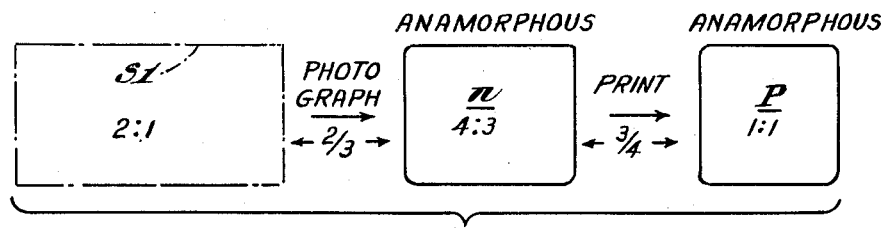
FIG. 4 is a diagram illustrating one example of the degree of anamorphosis in the photographing and printing steps of FIGS. 1 and 2.

As shown in FIG. 1 a wide scene S having an aspect ratio (relation of width to height) of 2:1 is photographed on negative photographic film N by means of an anamorphotic optical system O1. The optical system O1, including a negative cylindrical lens L1, a positive cylindrical lens L2, a spherical lens L3, and an aperture mask M1 produces upon the negative film N an anamorphous image $n$ of the scene or object S in which image the horizontal dimension is reduced in realtion to the vertical dimension by the cylindrical lens L1 and L2. As shown in FIG. 4 the image width is reduced by a factor of ⅔ as compared with the height of the image so as to produce an aspect ratio in the negative of 4:3.

Figure 2:
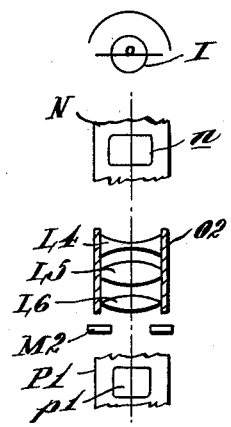
FIGS. 2 and 3 are schematic views illustrating the printing of positive records from the negative record of FIG. 1.

As shown in FIG. 2 a positive film P1 is printed from the negative N by means of a source of illumination I and printing anamorphotic optics O2 including a negative cylindrical lens L4, a positive cylindrical lens L5, a spherical lens L6, and a mask M2. The cylindrical lenses L4 and L5 produce further anamorphosis of the printed image $p_1$ on the positive film $P_1$. As shown in FIG. 4 the horizontal width of the positive image $p1$ is further anamorphosed by a factor of ¾ so that the overall anamorphotic factor is ½ and the aspect ratio of the print $p$ is further reduced to an aspect ratio of 1:1.

It will be understood that the positive print or record $p$ may be a print suitable for theatre projection or a dye absorptive matrix for use in imbibition printing upon a dye receptive blank film.

The invention, in its application to kinematography in particular, has the advantage of improving the utilization of the available area of the negative photographic material and optical field of the lens system utilized in making the primary record, and renders possible the portrayal of improved detail in the final picture produced from a negative of given area and emulsion characteristics with a given lens system.

Figure 5:
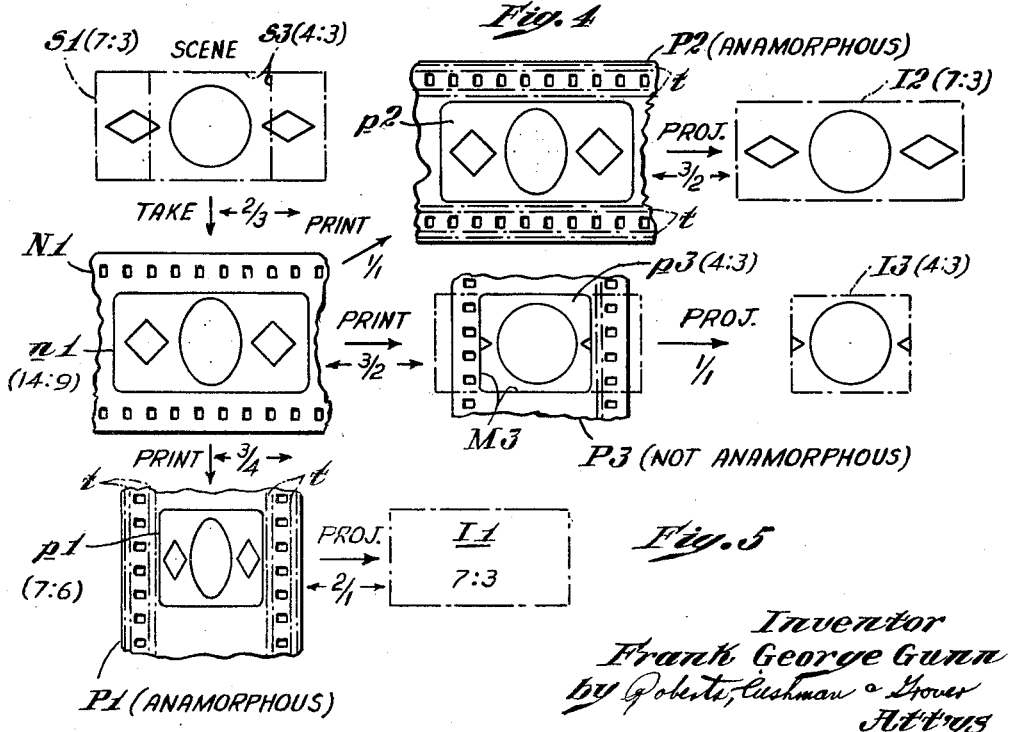
FIG. 5 is a diagram illustrating other degrees of anamorphosis in the photographing and printing steps of FIGS. 1 to 3.

Increased flexibility in the use of the negative record is possible in that it may be used to print not only records with further anamorphosis, such as the record $p1$, but also records of different format or aspect ratios, and normal records. As shown in FIG. 5 the negative N1 may be taken with a record $n1$ extending lengthwise of motion picture film and subsequently there may be printed from the negative N1 a more anamorphous print P1 on which the record $p1$ extends transversely of motion picture film, a print P2 wherein the record $p2$ extends lengthwise of motion picture film as in the negative, or a print P3 wherein a normal record $p3$ extends transversely of motion picture film in a standard aspect ratio.

The doubly anamorphous print P1 contains a record of a scene S1 having a 7:3 aspect ratio as shown in broken lines in FIG. 5. The negative N1 is taken with optics O1 having an anamorphotic factor of 2/3 in a camera which records the picture lengthwise of the film to the extent of approximately eight feed perforations. The negative record $n1$ will have an aspect ratio of approximately 14:9, although it will be understood that as a result of masking at the film aperture the ratio may vary slightly from theoretical proportions.

From the partially anamorphous negative N1 the doubly anamorphous print P1 may be produced with printing optics O2 which, having an anamorphotic factor of 3/4, reduce the record $p1$ to a 7:6 aspect ratio transversely of the print P1. The 7:6 record $p1$ differs only slightly from the standard 4:3 aspect ratio and allows for the addition of multiple sound tracks $t$ carrying sound from different parts of the wide scene S1. The positive record P1 may be displayed by projection optics having a 2/1 anamorphotic factor to produce an image I1 having a 7:3 aspect ratio.

Alternatively the negative N1 may be used in a contact or optical printer to produce a print P2 with a record $p2$ of the same size and aspect ratio, and also extending lengthwise of the film. The record $p2$ displayed by means of projection optics having an anamorphotic factor of 3/2 will produce a wide image I2 having an aspect ratio of 7:3.

Figure 3:
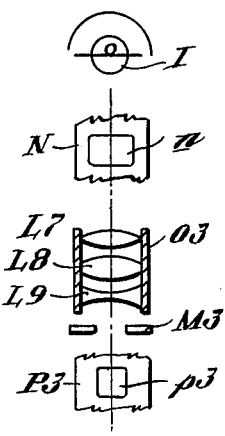

In many cases it will be desirable to make not only anamorphous prints but also standard prints, and as shown in FIGS. 3 and 5 the anamorphosis introduced in the printing stage may comprise a factor greater than 1 so as to expand the image of the negative N1 rather than reduce it. In FIG. 3 is shown an optical printer which comprises a source of illumination I and extending anamorphotic optics O3 including a spherical lens L7, a positive cylindrical lens L8, a negative cylindrical lens L9, and an aperture mask M3. With a printer having an anamorphotic factor of 3/2 a non-anamorphous print P3 may be made from the negative N1. As indicated by the broken lines overlying the print P3 the image of the negative record $n1$ is expanded by the printing optics O3 over an area whose width exceeds that of the positive $p3$. However, by means of the expanding optics all parts of the image are restored to their normal proportions, and by means of a mask M3 at the printing aperture the central portion of the image corresponding to the field S3 of the original scene S1 is printed on the film strip P3. This record will have a standard aspect ratio of 4:3 and may be displayed by normal projection optics having a neutral or 1/1 anamorphotic factor to produce a standard image I3.

I claim:

1. The method of producing photographically anamorphous motion picture records of scenes comprising the steps of photographing the scene by compression in only one direction of the image of the scene so as to produce a primary record having a degree of anamorphism, and printing the primary record with an additional degree of anamorphism by compression in the same direction as said one direction of the image of the scene upon a secondary record, the degree of anamorphism in the photographing and printing steps respectively being less than the total degree of anamorphism and the total degree of anamorphism in the secondary record being the product of anamorphism separately introduced in the two stages, said secondary record comprising substantially the whole of said primary record, and wherein the primary record extends lengthwise and the secondary record extends crosswise of a motion picture film strip.

2. The method according to claim 1 wherein the negative and positive records have standard aspect ratios.

References Cited in the file of this patent

UNITED STATES PATENTS

| | | |
|---|---|---|
| 1,372,936 | Clark | Mar. 29, 1921 |
| 1,829,633 | Chretien | Oct. 27, 1931 |
| 1,829,634 | Chretien | Oct. 27, 1931 |
| 1,894,264 | Chretien | Jan. 17, 1933 |
| 1,894,265 | Chretien | Jan. 17, 1933 |
| 1,938,808 | Ceccarini | Dec. 12, 1933 |
| 2,006,233 | Chretien | June 25, 1935 |
| 2,702,499 | Dyer | Feb. 22, 1955 |

FOREIGN PATENTS

| | | |
|---|---|---|
| 617,337 | Great Britain | Feb. 4, 1949 |